- A — FRESHLY CUT MACROCYSTIS PYRIFERA
- B — CHOPPER
- C — MILL
- D — HOLDING TANK
- E — KELP & MINERAL BLEND

- a — MINERAL MIX
- b — " "
- c — " "
- d — " " HOLDING TANK
- e — " " " "

- 1 — DEHYDRATOR
- 2 — MILL
- 3 — SCREEN
- 4 — PKG.
- 5 — INVENTORY

INVENTOR.
JOHN G. CARBONNIERE
BY White, Haefliger & Bachand
ATTORNEYS.

United States Patent Office 3,764,341
Patented Oct. 9, 1973

3,764,341
KELP DERIVED FEEDS CONTAINING SEQUES-
TERED TRACE MINERALS MIXED WITH
SULFATE SALTS
John G. Carbonniere, Gardena, Calif., assignor to
Ocean Labs Inc., San Pedro, Calif.
Filed Sept. 24, 1970, Ser. No. 74,961
Int. Cl. A23k 1/14, 1/16
U.S. Cl. 99—2 CD                                16 Claims

ABSTRACT OF THE DISCLOSURE

Freshly harvested kelp is slurried and supplemented by the addition of soluble trace mineral sulfates and ethylene diamine dihydriodide, followed by dehydration of the resulting slurry and grinding of the dehydrated material to produce a feed product containing the trace minerals in sequestered and stabilized condition.

SUMMARY OF THE INVENTION

This invention relates to the processing of freshly cut raw *Macrocystis pyrifera* (giant brown kelp), typically as harvested from Pacific ocean waters, the composition of which may vary depending upon particular ocean sources, e.g. Pacific vs. Atlantic. Hereinafter this specie will be referred to simply as kelp.

The invention has for its general object to treat the kelp in a manner permitting incorporation of trace minerals which, along with natural values, become sequestered in the final product by reason of certain peculiar properties of the kelp. The latter contains a high level of polysaccharides by virtue of which, along with other components of the kelp, give the latter unique properties for the sequestration and stabilization of natural and added trace mineral values productive of high quality feeds for consumption as by ruminants, swine and poultry.

Procedurally the process may be characterized as converting rapidly the freshly cut kelp (which ferments radially and therefore loses effectiveness), into a pulp or paste-like slurry by distintegration in any suitable manner as by passage through a chopper or macerater, and then to a hammer mill from which the kelp emerges in slurry form.

Trace minerals are prepared by the addition of water soluble sulfates (plus ethylene diamine dihydriodide, if needed) of the group consisting of zinc sulfate, manganese sulfate, ferrous sulfate, copper sulfate and cobalt sulfate in quantities and proportions subject to variation according to the desired trace mineral content in the end product. The trace mineral content may take into consideration components of the kelp itself such as potassium chloride, sodium chloride, magnesium sulfate, iodine and added or natural vitamins. The mineral solution is introduced to the kelp slurry in proper predetermined proportions, uniformly mixed and then fed into a suitable dehydrator, preferably under conditions of controlled flow, heat and time.

When adequate moisture has been removed the product which is in small flake form as removed from the dehydrator, is passed through a mill or grinder and then screened and bagged. The product can be made available in regular and extra fine grinds, the latter being useable to advantage in liquid applications because it will readily go into and remain in suspension.

The product is characterized by virtue of its polysaccharide content in its capacity to surround and isolate the metallic ions. Sequestration and derivation of added mineral elements and iodine results from reaction of the ionized mineral sulfate salts and ethylene diamine dihydriodide (EDDI) with the polysaccharides in the kelp. The water soluble product having a pH in water solution in the range of about 3.5 to 5.0, releases its metallic ions when digested by enzymatic action or exposure to the level of acidity existing in the consuming animal or fowl. The sequestering process appears to be physical rather than chemical in that the inorganic metallic cations and even the anions in the trace minerals are separated in their consumable condition.

Analyses of the product may vary widely as to mineral content so long as the kelp content is sufficient to sequester the total minerals added. Minimum kelp content may range from as low as about 15%, e.g. as in a swine formulation, with the kelp content for e.g. ruminant formulas, ranging as high as 85%.

The details of an illustrative method for practicing the invention and achieving the characteristics discussed in the foregoing, will be explained by reference to the accompanying drawing.

Figure 1:
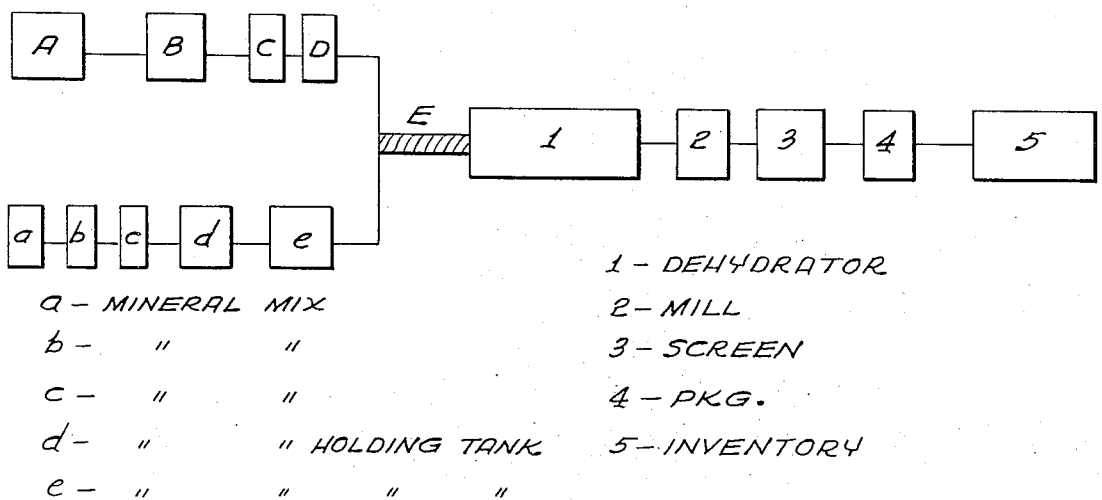
FIG. 1 is a diagrammatic illustration of the process in flow sheet form.

In reference first to FIG. 1, the freshly harvested kelp enters the system at tank A from which, with or without the addition of water, the kelp passes successively through chopper B and mill C both of which may be of any suitable or conventional type capable of reducing the kelp to pulp consistency. The resulting slurry enters holding tank D from which the slurry flows to a suitable blender E for admixture with the mineral sulfate solution.

The latter is prepared by the formation in any suitable sequences of aqueous sulfate solutions and the iodine source if needed, in mixers *a*, *b* and *c* followed by delivery of the combined solutions to holding tanks *d* and *e* from which the solution passes to the blender E for intimate and uniform mixing with the kelp slurry.

Figure 2:
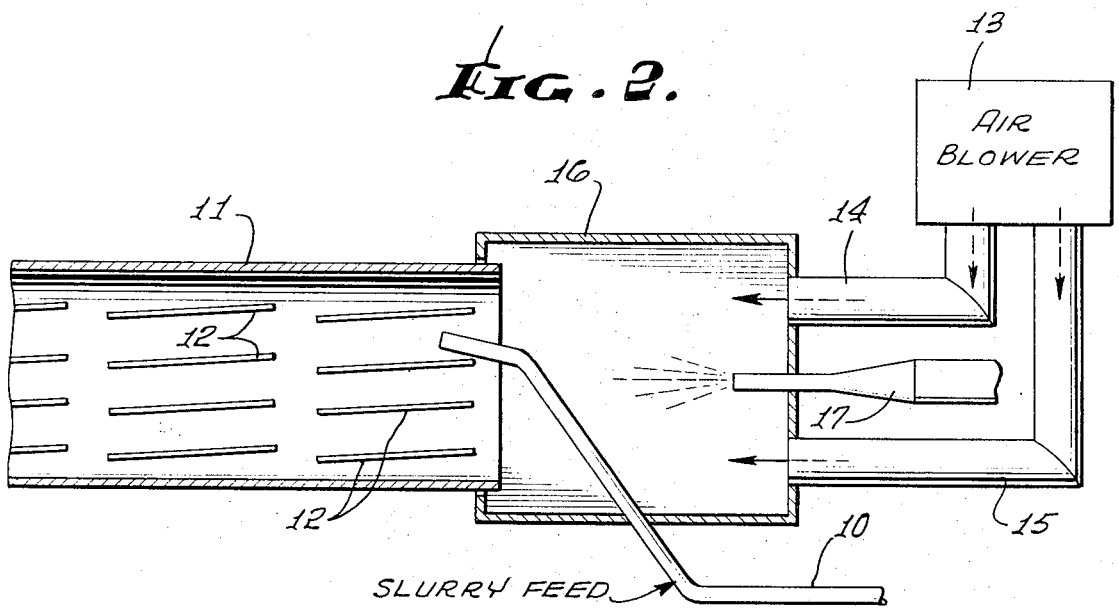
FIG. 2 is a fragmentary sectional enlargement showing an illustrative dehydrator system.

The admixture then enters the dehydrator 1 wherein its moisture content is reduced to a predetermined amount generally in the range of about 10 to 4 weight percent of the final product, and as a specific example to about 8% moisture content. Broadly contemplated is the use of any suitable dehydrator, typically as depicted in FIG. 2. Here the slurry feed is shown to be introduced through line 10 into a revolving tube or drum 11 equipped with lifting fins 12 to maintain the slurry in a state of agitation and exposure as it undergoes progressive dehydration. Air is supplied from blower 13 through ducts 14 and 15 into chamber 16 receiving combustible gas from jet 17 so that the entering air and combustion gases are premixed before entering the dehydrator drum 11 and prior to admixture with the slurry being discharged into the drum from line 12. The dehydrator may have any suitable known means for separately withdrawing the hot and heated gas and air mixture from the discharge end of the drum and for passage of the dehydrated product to suitable disintegration means such as successively a grinding mill 2, screening facility 3 and packaging stage 4 from which the screened product or products goes to inventory 5.

Using a combustion gas and air mixture in the range typically of about 300–350° F., the dehydration results in at least partial dissociation of the sulfate radicals as evidenced by the detectable odor of sulfur dioxide in the dehydrator gas effluent. Thus, the mineral sulfates having been dissolved in aqueous concentration sufficiently low for their complete solubilities, the dehydration step produces at least a partial but undetermined degree of decomposition of the sulfate ion, leaving any residue for sequestering in the product.

The selection and proportion of the added sulfates and iodine source may vary and somewhat widely depending upon the intended use of the feed product. Thus the individual trace elements expressed as elements in the product may range within about the following limits:

| | Percent |
|---|---|
| Zinc | 20–0 |
| Manganese | 15–0 |
| Iron | 12–0 |
| Copper | 13–0 |
| Cobalt | 12–0 |
| Iodine | .5–0 |

In general the product will contain all of the minerals within the percentage ranges indicated, although if for any reason desired in particular feeds, some but not necessarily all of the added minerals may be present in the product.

As previously indicated, the product is found to have outstanding nutrient values by reason of the property of the kelp to sequester and maintain in stabilized condition all of these added trace minerals as well as values including natural or added vitamins present in the kelp itself. The sequestration appears to result in some if not substantially complete deionization of the mineral sulfates with the metallic cations held sequestered until they can become nutritionally effective when digested by enzymic action or the acidity in the digestive environment of the consuming animal or fowl.

I claim:

1. The process that includes disintegrating freshly harvested kelp and mixing a pulp slurry thereof with dissolved trace elements sources of the group consisting of zinc sulfate, manganese sulfates, ferrous sulfate, copper sulfate and cobalt sulfate all in normal ionizable salt forms, and heating and dehydrating the resulting mixture at a temperature as high as from 300°–350° F. to volatilize sulfur dioxide therefrom to obtain a product in which the trace minerals are sequestered by virtue of the properties of the kelp.

2. The process of claim 1 in which all the named sulfates are mixed with the kelp slurry.

3. The process of claim 1 in which dissolved ethylene diamine dihydriodide is included with the sulfates as iodine source.

4. The process of claim 2 in which dissolved ethylene diamine dihydriodide is included with the sulfates as iodine source.

5. The process of claim 4, in which the trace mineral content ranges are about the following weight percentages of the dehydrated product:

| | Percent |
|---|---|
| Zinc | 20–0 |
| Manganese | 15–0 |
| Iron | 12–0 |
| Copper | 13–0 |
| Cobalt | 12–0 |
| Iodine | .5–0 |

6. The process of claim 5, in which all the named sulfates are mixed with the kelp slurry.

7. The process of claim 1, in which the dehydrated product contains between about 10 to 4 weight percent moisture.

8. The process of claim 5, in which the dehydrated product contains between about 10 to 4 weight percent moisture.

9. The process of claim 1 in which the sulfates are dissolved in water and then mixed with the kelp slurry to form a slurry mixture.

10. The process of claim 1, in which the sulfates are dissolved in water and then mixed with the kelp slurry to form a slurry mixture, and the slurry is dehydrated with evolution of the sulfur dioxide.

11. The process of claim 10, in which the dehydrated product contains about 8 weight percent moisture.

12. The product of claim 1, in which the dehydrated product is ground and screened.

13. The process of claim 4, in which the dehydrated product is ground and screened.

14. The process of claim 9, in which said slurry mixture is dehydrated by being fed in concurrent flow with hot combustion gas.

15. The process of claim 10, in which said slurry mixture is dehydrated by being fed into a revolving drum in concurrent flow with hot combustion gas.

16. The process of claim 11, in which said slurry mixture is dehydrated by being fed into a revolving drum in concurrent flow with hot combustion gas.

References Cited

UNITED STATES PATENTS

| 2,487,162 | 11/1949 | Meyer et al. | 99—8 |
| 2,637,121 | 5/1953 | Steere | 99—8 |
| 2,725,677 | 12/1955 | Myers | 47—1.4 |
| 2,960,406 | 11/1960 | Cardon | 99—2 |
| 3,403,471 | 10/1968 | Clement | 47—1.4 |
| 3,396,104 | 8/1968 | Miller | 99—2 |
| 3,360,868 | 1/1968 | Arnold | 99—199 |

OTHER REFERENCES

Scientific American, vol. 187, No. 6, Weiss, December 1952, pp. 15–18.

Algal Culture, Burlew, pp. 90, 92, 94, 95, 98, 100, 101, 214, 215, 217, 218.

NORMAN YUDKOFF, Primary Examiner

U.S. Cl. X.R.

99—2 R, 8